United States Patent [19]

Ong et al.

[11] Patent Number: 5,456,991
[45] Date of Patent: Oct. 10, 1995

[54] FUEL CELL CATHODES

[76] Inventors: Estela T. Ong, 2931 S. Emerald Ave., Chicago; Rafael A. Donado, 6340 N. Keeler, both of, Chicago, Ill. 60646

[21] Appl. No.: 406,639

[22] Filed: Mar. 20, 1995

Related U.S. Application Data

[63] Continuation of Ser. No. 999,300, Dec. 31, 1992, abandoned.

[51] Int. Cl.⁶ .................... H01M 4/86; H01M 4/36
[52] U.S. Cl. .................. 429/44; 429/16; 429/41; 429/223
[58] Field of Search .................. 429/16, 44, 40, 429/41, 223

[56] References Cited

U.S. PATENT DOCUMENTS

| | | | |
|---|---|---|---|
| 4,460,495 | 7/1984 | Iacovangelo | 429/16 X |
| 4,548,877 | 10/1985 | Iacovangelo et al. | 429/41 |
| 4,564,567 | 1/1986 | Kucera et al. | 429/41 |
| 4,759,989 | 7/1988 | Abe et al. | 429/44 X |
| 4,992,341 | 2/1991 | Smith et al. | 429/40 |

*Primary Examiner*—John S. Maples

[57] ABSTRACT

Fuel cell cathodes formed by the oxidation of a porous, fiber reinforced, green structure and methods of fabricating cathodes of the character just described.

10 Claims, 1 Drawing Sheet

FUEL CELL CATHODES

RELATED APPLICATIONS

This is a continuation of application Ser. No. 07/999,300 filed on 31 Dec. 1992, now abandoned.

Application Ser. No. 07/881,686 filed 12 May 1992, now U.S. Pat. No. 5,312,580 by Diane S. Erickson for METHOD OF MANUFACTURING POROUS METAL ALLOY FUEL CELL COMPONENTS is a related application.

1. Technical Field of the Invention

The present invention relates to fuel cells and, more specifically, to novel, improved fuel cell electrodes and to processes for making those electrodes.

2. Background of the Invention

Fuel cells were invented in 1839 by Sir William Grove. A fuel cell is an electrochemical device which directly combines a fuel such as hydrogen and an oxidant such as oxygen to produce electricity and water. It has an anode and a cathode spanned by an electrolyte. Hydrogen is oxidized to hydrated protons on the anode with an accompanying release of electrons. At the cathode, oxygen reacts with protons to form water, consuming electrons in the process. Electrons flow from the anode to the cathode through an external load, and the circuit is completed by ionic current transport through the electrolyte.

Fuel cells do not pollute the environment. They operate quietly, and they have a potential efficiency of ca. 80 percent. Virtually any natural or synthetic fuel from which hydrogen can be extracted can be employed.

A variety of electrolytes have been proposed. These include: aqueous potassium hydroxide, concentrated phosphoric acid, fused alkali carbonates, and stabilized zirconium oxide. Molten carbonate fuel cell (MCFC) power plants are of particular interest. Like others, molten carbonate fuel cells produce electrical energy via electrochemical reaction between hydrogen and an oxidant. Fuels such as reformed natural gas, reformed naphtha, and gasified coal are used as a source of hydrogen. The oxidant is air mixed with the byproduct $CO_2$ produced by the anode reaction. It is generally accepted that the electrochemical reactions taking place are as follows.

In the anode:

$$H_2 + CO_3^{2-} \rightarrow H_2O + CO_2 + 2e \qquad (1)$$

where e are the electrons that move from anode to cathode, producing an electrical current. The $CO_2$ produced by the previous reaction is recovered and mixed with air and used as the oxidant in the cathode, where the reaction is:

$$\tfrac{1}{2}O_2 + CO_2 + 2e \rightarrow CO_3^{2-} \qquad (2)$$

The carbonate ions ($CO_3^{2-}$) move through the electrolyte to the anode, completing the cycle.

Molten carbonate fuel cell components are thin, flat materials with a porosity and pore size distribution carefully tailored for proper electrolyte distribution by virtue of capillarity. The basic cell package typically consists of an anode, a cathode, current collectors, and an electrolyte structure composed of a matrix and an electrolyte retained in the matrix by capillarity. Because of cost, performance, and endurance considerations, the basic components of a MCFC fuel cell must be: easily manufactured by simple scalable techniques, stable in the fuel cell, and able to meet threshold performance levels.

Current molten carbonate fuel cells use nickel-based electrodes. The anode also contains hardening and strengthening agents such as chromium and aluminum that form lithium chromite and alumina or lithium aluminate during cell operation. State-of-the-art cathodes consist of a porous nickel plaque that is allowed to oxidize in-situ during cell operation in the presence of the molten alkali carbonate electrolyte to form an oxide semiconductor, known in the art as lithiated nickel oxide (LNO), which has the formula ($Li_xNi_{(1-x)}O$).

The nickel plaque used as a cathode is sintered in a reducing environment at an elevated temperature to promote sintering, a step in which nickel particles bond to each other and develop strength. Upon oxidation, the sintering bonds are disrupted; and the cathode loses strength. Consequently, there is a present and continuing need for improved cathodes for fuel cells of the type currently employing nickel plaque cathodes.

SUMMARY OF THE INVENTION

It has now been found that the propensity of conventional, nickel plaque MCFC cathodes to lose strength under operating conditions can be significantly reduced by fiber reinforcement of the porous plaque. The reinforcement helps to distribute the load throughout the structure and prevents concentration of local stresses that would cause fracture. At the same time, the reinforcement can be incorporated in the cathode structure without any adverse effect on cell performance.

The objects, features, and advantages of the invention will be apparent to the reader from the foregoing and the appended claims and as the ensuing detailed description and discussion of the invention proceeds in conjunction with the accompanying drawings.

BRIEF DESCRIPTION OF THE DRAWING

The single FIGURE is a section through a fuel cell which may be provided with a fiber reinforced cathode embodying the principles of the present invention.

DETAILED DESCRIPTION OF THE INVENTION

Figure 1:
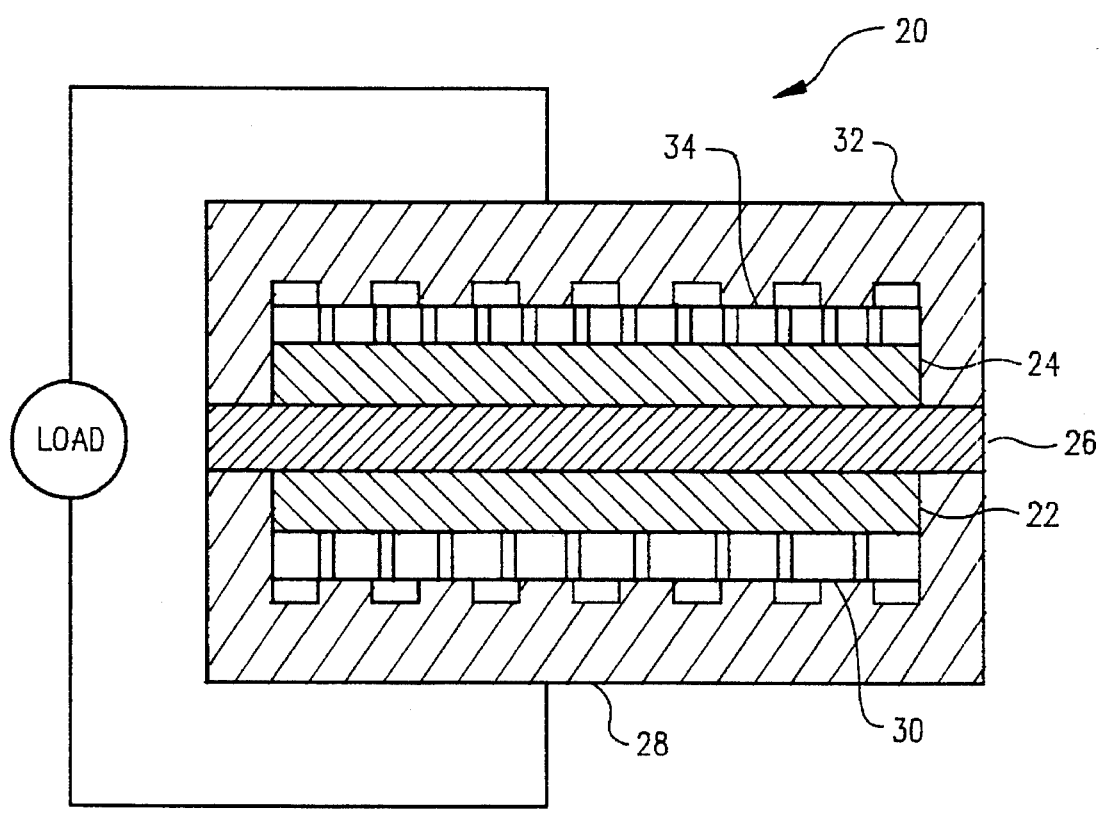

Referring now to the drawing, the single FIGURE depicts a molten carbonate fuel cell 20 having an anode 22, a cathode 24, and an electrolyte matrix 26. Anode 22 is housed in anode flange 28 along with anode current collector 30 while cathode 24 is housed in cathode flange 32 along with cathode current collector 34.

Anode 22 may have a composition of Ni+Cr or Ni+Al. The Cr or the Al content can be 0.5 to 10 percent by weight.

The electrolyte matrix 26 is typically $LiAlO_2$ with a nominal porosity of 45% to 70% and a mean pore size of 0.1 to 0.7 μm. The porous $LiAlO_2$ structure is impregnated with a mixture of $Li_2CO_3$ and $K_2CO_3$, usually the eutectic composition which is 62% by mole $Li_2CO_3$ and 38% by mole $K_2CO_3$. The electrolyte matrix prevents the mixing of the fuel and the oxidant supplied through the channels of the flanges 28 and 32, respectively. The perimeter of the electrolyte matrix seals against the raised edges of the flanges to prevent the fuel and the oxidant from leaking into the external atmosphere.

A typical fuel that is fed through the channels of the anode flange 28 is a humidified mixture of $H_2$ and $CO_2$, and a typical oxidant that is fed through the cathode flange 32 channels is a humidified mixture of air and $CO_2$.

It is a salient feature of the present invention that the loss in strength of a conventional nickel fuel cell cathode attributable to the conversion of a continuous nickel phase to an agglomeration of NiO particles can be offset by fiber reinforcement. This makes it possible to relax the requirements for current collector 34 or to even altogether eliminate that component. In both cases, the integrity of the cell is significantly improved.

Fiber reinforced green structures which can be converted to NiO MCFC cathodes by in situ oxidation can be fabricated, in accord with the principles of the present invention, by impregnating an appropriate nickel mat reinforcement with a slurry of nickel powder to provide the surface area and porosity needed for efficient MCFC operation.

One satisfactory starting material, which contains fine nickel fibers suitable as reinforcements, is marketed by National Standard under the trade name FIBREX. As-received FIBREX mats, however, could not be used as a MCFC cathode. FIBREX has large, unacceptable, see-through pores and high porosity (85%–95%), which makes it unusable for MCFC cathodes; and it does not contain enough nickel powder to provide sufficient surface area for electrode reaction.

A slurry method is employed to impregnate the mat with nickel particles. This reduces porosity and increases the reaction surface area and thereby converts the FIBREX mat to a structure capable of functioning efficiently as a fuel cell cathode.

Typically, a slurry of nickel powder is cast onto a flat substrate by a doctor blade. The FIBREX mat is laid on the slurry, and the tape is allowed to dry. This results in the impregnation of nickel through approximately half of the mat thickness. After the tape dries, it is removed from the substrate.

A second nickel slurry is cast, and the unimpregnated side of the mat is laid on the nickel slurry. This results in the impregnation of the other side of the mat by the particulate nickel slurry. Thereafter, the tape and mat are dried; and the second tape is removed to complete the fabrication of the green cathode structure.

Additional details of a tape casting process which can be adapted to the casting of particulate metal tapes as just described are available in U.S. Pat. No. 5,312,580.

Normally, a tape cast nickel cathode is sintered in a furnace at a temperature of 800°–1100° C. in a reducing atmosphere before it is assembled in a cell. The green electrode structures of the present invention have the advantage that they can be directly assembled in the cell without sintering, therefore costing less to process. After assembling the green structure in a cell such as that identified by reference character 20, the cell can be heated to its operating temperature of 600°–700° C. according to normal procedure.

Additional details of a MCFC cathode as disclosed herein appear in the working example which follows:

EXAMPLE I

A nickel mat having about 95% porosity and a fiber/powder ratio of 80/20 was impregnated as described above to produce a green, nickel, cathode structure with 84% porosity, a final fiber/powder ratio of 39/61, and a thickness of 30 mils. The green structure was converted in situ in the manner also discussed above to a fiber reinforced cathode in a 3 $cm^2$ MCFC test cell.

The cell performance was quite acceptable. It yielded a cell potential of 855 mV at 160 $mA/cm^2$ using an oxidant of 30 $CO_2$/70 air humidified at room temperature and a fuel of 75 $H_2$/25 $CO_2$ humidified at 60° C.

Many modifications may be made without exceeding the scope of the invention. For example, pore matching of the cathode with other active MCFC components can be employed to optimize the performance of an endless variety of MCFC's with cathodes embodying the principles of the present invention. Also, the reinforcement can be in the form of loose fibers, screen, expanded metal, and other materials with construction elements in a form having a large length-to-diameter ratio; and the reinforcement material can be based on cobalt, silver, copper, iron, aluminum or their stable products in the cathode environment. The present embodiment is therefore to be considered in all respects as illustrative and not restrictive, the scope of the invention being indicated by the appended claims rather than by the foregoing description. All changes which come within the meaning and range of equivalency of the claims are therefore intended to be embraced therein.

What is claimed is:

1. A molten carbonate fuel cell cathode obtained by the in situ oxidation of a green structure composed of a particulate, conductive, elemental metal and a fibrous, conductive, elemental metal matrix.

2. A cathode as defined in claim 1 in which the matrix is composed of an element having a large length-to-diameter ratio.

3. A cathode as defined in claim 2 in which the matrix is composed of loose fibers, a mat, a screen, or an expanded metal.

4. A cathode as defined in claim 1 in which the matrix is composed of elemental nickel, cobalt, silver, copper, iron, or aluminum which is stable in a molten carbonate fuel cell operating environment.

5. A molten carbonate fuel cell which has a cathode as defined in claim 1.

6. A fuel cell comprising an anode, a cathode, and an electrolyte between the anode and cathode, said cathode being fabricated by the in situ oxidation in said cell of a green structure composed of a particulate, conductive, elemental metal and a fiber-type, elemental metal reinforcement present in an amount sufficient to mechanically strengthen the cathode at the fuel cell operating temperature.

7. A fuel cell as defined in claim 6 in which the reinforcement is composed of an element having a large length-to-diameter ratio.

8. A fuel call as defined in claim 6 in which the reinforcement is composed of loose fibers, a mat, a screen, or expanded metal.

9. A fuel cell as defined in claim 6 in which the reinforcement is composed of elemental nickel, cobalt, silver, copper, iron, or aluminum which is stable in the operating environment of the fuel cell.

10. A fuel cell as defined in claim 6 in which the electrolyte is a mixture of carbonates which is molten at the operating temperature of the fuel cell.

* * * * *